Dec. 10, 1929.    L. J. BOMHOFF    1,738,521
SEPTIC SEWAGE DISPOSAL PLANT
Filed March 20, 1928
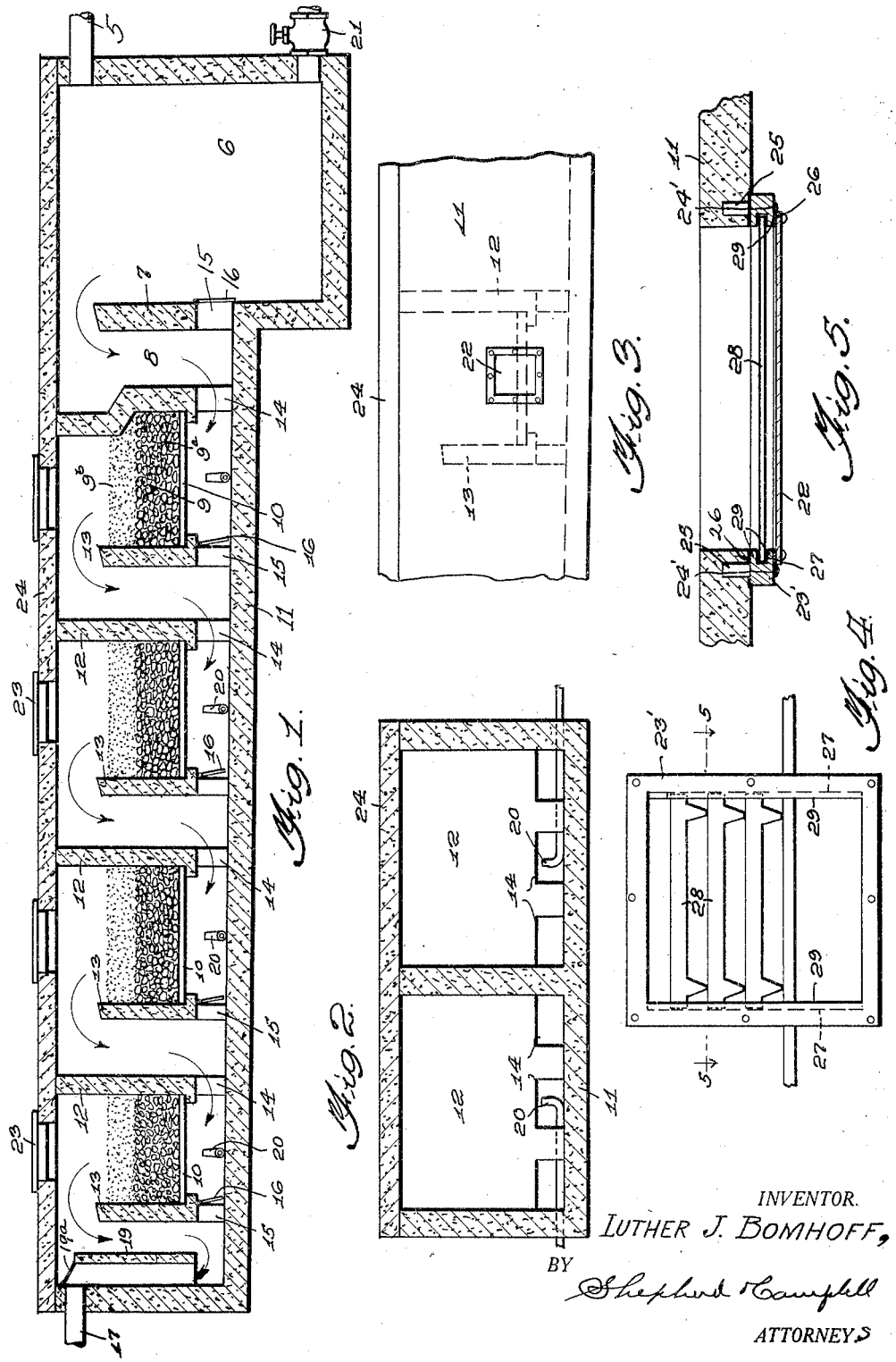
INVENTOR.
LUTHER J. BOMHOFF,
BY
ATTORNEYS Patented Dec. 10, 1929

1,738,521

UNITED STATES PATENT OFFICE

LUTHER JAMES BOMHOFF, OF GIRARD, KANSAS, ASSIGNOR OF ONE-HALF TO MARION G. SLAWSON, OF GIRARD, KANSAS

SEPTIC SEWAGE-DISPOSAL PLANT

Application filed March 20, 1928. Serial No. 263,091.

This invention relates to septic sewage disposal plants, and it has for its object to provide a construction, in devices of this character, by means of which grease and other oily substances and the heavy elements from the liquid sewage may be prevented from reaching the filter beds and clogging them. It is a well known fact that the primary function of the cinder or gravel filter beds, into which the effluent from the discharge of septic tanks is commonly directed, is to permit thorough aeration of the effluent, and that it is only when the filter beds can properly function to this end that the finally discharged effluent is dendered completely harmless. Therefore, it will readily be seen that if the pores or interstices of the filter beds are filled with grease from the septic tank, the usefulness of the filter beds, for the purposes above stated, will be destroyed.

Clogging of the filter beds, by grease, lighter portions of the sludge, etc., is prevented, under the present invention, by providing, within the septic tank proper, intercepting means by which the grease and silt will be trapped and prevented from passing through the outlet of the septic tank to the filter beds.

In the accompanying drawings:

Fig. 1 is a longitudinal sectional view of one of the units of my improved septic sewage disposal plant.

Fig. 2 is a fragmentary transverse sectional view therethrough.

Fig. 3 is a fragmentary side view.

Fig. 4 is a face view of a door frame and door, hereinafter described, and

Fig. 5 is a horizontal sectional view through said frame and said door, on line 5—5 of Fig. 4.

Like numerals designate corresponding parts in all of the figures of the drawing.

Referring to the drawing, 5 designates the intake through which the raw sewage is discharged into a receiving and settling compartment 6. It may here be stated that the plant is preferably made of concrete, though the use of any suitable material is within the scope of the invention. The overflow from compartment 6 passes over the top of a partition wall 7, and into a space 8, which constitutes a still water pocket for the accumulation of grease, etc. A certain amount of grease, silt, and certain of the heavier particles of matter will lodge on the floor of the pocket 8, while the principal liquid portion of the sewage will flow upwardly through a suitable granular filter bed 9. This filter bed may consist of coarse and fine gravel $9^a$—$9^b$, respectively, or it may consist of gravel and sand, or coke or cinders of varying sizes, and, in fact, of any suitable material. The coarser material $9^a$ is supported upon grate bars 10. It will be observed that there are a plurality of the filtering units, and since they are all alike, a description of one will serve as a description of all. It is sufficient to say that these filtering units are located in an elongated tank 11, and that each filtering unit comprises a front wall 12, which extends to the top of the tank, and a rear wall 13, which terminates short of the top of the tank, so that the liquid passing from the filter may flow over the top of the same and into the still water pocket 8, of the next succeeding filtering unit. Openings 14 permit passage of the material to a point beneath the grate bars 10, whence the material flows upwardly through the respective filtering units. A certain amount of grease, sludge, etc., will be trapped in the space beneath each set of grate bars, and in order that this trapped material may be removed, I provide openings 15 in the rear walls 13, and in the wall 7, which are normally closed by doors 16. The outlet to the filter beds is indicated at 17, and the liquid finds its way to said outlet through a compartment 19. An inspection and clean-out door $19^a$ closes the top of the compartment 19, and forces the liquid to enter the filtering material 9 from the bottom. The structure illustrated in Fig. 1 may be duplicated, as is illustrated in Fig. 2. By providing duplicate arrangement of parts, one of these sewage disposal units may be cut out of action, while leaving the other in action. By this means, one disposal unit consisting of receiving compartment 6, and the associated filtering units, may be cleaned of accumulated sludge, grease, etc., while leaving the other available for use during such cleaning operation. Cleaning is effected by discharging water, under pressure, through up-turned nozzles 20, that are disposed beneath the grate bars 10, while, at the same time, a sludge discharge valve 21, in a discharge pipe leading from the compartment 6, is open. This permits the water discharged from the nozzles to flow out of the apparatus, carrying with it the accumulated sludge and grease. During this cleaning operation the doors 16 open to permit the passage of the material that is being flushed out.

It is to be noted that the nozzles are directed in such way that they will discharge forcibly up into the beds of filtering material, thereby loosening accumulated deposits, and aiding in cleaning the filtering units. While I have said that water will be discharged through the nozzles 20, it is to be understood that the invention is not limited in this respect, because it would be advantageous to discharge high temperature steam through said nozzles, to first heat up and release accumulated grease, and thereafter discharge water, under pressure, through said nozzles, to wash out the released materials. Therefore, where steam is available, I would consider it within the purview of this invention to utilize the same in the manner indicated. The pipes by which nozzles 20 are carried are preferably flexible, so that they may be swung back and forth beneath the grates to effectively reach all parts thereof. It will, of course, be understood that in the construction of the apparatus, suitable reinforcing elements may be embedded in the concrete to strengthen the same in a manner common in the construction of reinforced concrete. However, this does not go to the essence of the invention, and no attempt has been made to illustrate these common and well known reinforcing bars.

Doors 22 may be located at the side of the tank 11, and preferably opposite the filtering units, while man-holes and man-hole covers 23 may be located in the top 24 of the structure above each filter unit. The flexible pipes of nozzles 20 may be manipulated through these doors.

The doors 22 are carried by frames 23', and the latter secured to the side walls of the tank by cap screws 24', taken into suitable expansion sockets 25, embedded in the concrete. Gaskets 26 form a water-tight joint about the frames 23'. The sides of the frames are grooved, as indicated in the sectional view, Fig. 5, at 27, for the reception of door bars 28. The ribs 29, by which the grooves 27 are formed, are cut away at the upper right hand corner of the frame, to permit of the insertion of the door bars 28. The function of these door bars is to prevent the filtering material from dropping out when the clean-out doors 22 are opened.

It is to be understood that the invention is not limited to the precise construction set forth, but that it includes within its purview whatever changes fairly come within either the terms or the spirit of the appended claims.

Having described my invention, what I claim is:

1. A device of the character described, comprising a receiving and settling compartment and an intake discharging thereinto, an elongated tank, the rear wall of the receiving and settling compartment terminating short of the top of said tank to permit the contents of said compartment to overflow into said elongated tank, a plurality of filtering elements arranged in series in said elongated tank, each comprising a front wall which extends to the top of the tank, and a rear wall which terminates short of the top of the tank, with openings leading through the lower portion of the front walls, grate bars spanning the space between the front and rear walls of each filter element above the level of said openings, filter beds of granular material supported upon said grate bars, and there being openings formed through the rear walls of the filtering elements beneath the level of said grate bars, and forwardly opening doors controlling said openings, and clean-out doors at the sides of the said filter elements comprising door frames and door, and removable bars inwardly of said doors which span the opening of the door frame.

2. A device of the character described, comprising a relatively deep receiving and settling compartment, and an elongated shallower tank, said tank containing a series of filters each of which comprises a front wall extending to the top of the tank and a rear wall terminating short of the tank and a body of filtering material, the bodies of filtering material being spaced from the bottom of the tank to leave a continuous passageway therebetween from end to end of the tank, the rear wall of the receiving compartment having an opening formed therein, the spaces beneath the several filters being closed by forwardly freely opening doors closed by the flow of water, the front wall of each of said filters being spaced from the rear wall of the next preceding filter, and the front wall of the first filter being spaced from the rear wall of the receiving compartment to thereby form pockets therebetween, the lower portions of which constitute a part of the longitudinal passageway through the tank, upwardly directed flushing nozzles beneath the several filters, the flow of the liquid being upwardly through the filtering beds of the several filters over the rear walls of said filters and beneath the front wall of the next succeeding filter, said doors preventing the direct passage of the material longitudinally of the tank beneath the filters and forcing the material to flow upwardly through the filters, said doors opening forwardly by the backward flow of the water to permit a direct flushing flow longitudinally of the tank beneath the filters, and through the opening of the rear wall of the receiving compartment when the nozzles are used to flush the filters.

In testimony whereof I affix my signature.

LUTHER J. BOMHOFF.